United States Patent [19]
Brown

[11] Patent Number: 4,762,012
[45] Date of Patent: Aug. 9, 1988

[54] UNIVERSAL UPSTREAM-DOWNSTREAM FLOWMETER TESTER

[75] Inventor: Alvin E. Brown, Santa Cruz, Calif.

[73] Assignee: Manning Technologies, Inc., Santa Cruz, Calif.

[21] Appl. No.: 8,613

[22] Filed: Jan. 29, 1987

[51] Int. Cl.⁴ .............................................. G01F 25/00
[52] U.S. Cl. ........................................ 73/866.4; 73/3
[58] Field of Search ............ 73/3, 886.4, 861.28, 73/861.29

[56] References Cited
U.S. PATENT DOCUMENTS 3,981,191  9/1976  Brown .
4,509,373  4/1985  Brown .............................. 73/861.28
4,520,650  6/1985  Palmer et al. ............................ 73/3

Primary Examiner—Tom Noland
Attorney, Agent, or Firm—Thomas Schneck

[57] ABSTRACT

A circuit simulating the electrical signal response of a flowing liquid whose velocity is to be measured by an upstream-downstream flowmeter. The circuit takes the electrical flowmeter transmit signal from an upstream-downstream flowmeter and actuates a gated oscillator which feeds pulses to a counter, establishing an electrical signal which has a duration of almost the mean transit time of an acoustic signal traveling between transducers and the flowmeter. This signal is incremented by further pulse counts and these further pulses are indicative of the exact mean transit time, plus pulses arriving on either side of the exact mean transit time, indicative of the upstream and downstream transit times. The upstream and downstream pulses are fed to a second oscillator for wave shaping. The second oscillator and associated circuitry simulates electrical signals produced by a transducer receiver in the flowmeter.

6 Claims, 3 Drawing Sheets

UNIVERSAL UPSTREAM-DOWNSTREAM FLOWMETER TESTER

1. Technical Field

The invention relates to an electrical circuit for testing an upstream-downstream type of ultrasonic flowmeter.

2. Background Art

Upstream-downstream ultrasonic flowmeters measure the velocity of sonic propagating material flowing in a pipe or other conduit relative to the geometry of the sound source and sound receiver of the measuring system. One such flowmeter is described in U.S. Pat. No. 3,981,191 to Alvin E. Brown and Niels Thun. The patent describes how fluid flow rate and sound propagation velocity through a fluid are measured. Upstream and downstream transducers are used to generate acoustic pulses whose transit times are shifted in time relative to each other as a function of the flow velocity of the propagating medium.

The transmit pulses are directed alternatively upstream and downstream of the flowing medium. The transmitted pulses are received and compared in phase to reference pulses. Logic signals are generated in accordance with the early and late arrival of said received pulses relative to said reference pulses. The statistical average of all early and all late signals is obtained to provide a first signal level related to the sound speed in said medium. Logic signals corresponding to the early and late arrival of signals relative to said reference signals are generated and correlated with the direction of transmission. The statistical average of at least one pair of early and late arrival signals is obtained to provide a second signal level related to fluid flow velocity of said medium. The first and second signal levels for each of said upstream and downstream transmissions are arithmetically combined to vary the delay time of said reference pulses for each of said upstream and downstream transmissions such that said reference pulses track the actual time of arrival of said transmitted pulses.

One of the problems experienced in the prior art is that upstream-downstream flowmeters usually employ oscillators or multivibrators whose accuracy and stability is very difficult to maintain. An error of only a few nanoseconds may translate to inaccuracy of several percentage points. In U.S. Pat. No. 4,509,373 to A. Brown, assigned to the assignee of the present invention, a calibration circuit is disclosed for use within a flowmeter. The calibration circuit involves a frequency counted variable delay signal for comparing a received acoustic signal against the variable delay calibration signal. The variable delay is attributable to a frequency count from a stable source. The accuracy of the counter is verified against the standard so that a higher degree of accuracy is attained. While this calibration circuit maintains high accuracy for an upstream-downstream flowmeter, the circuit is built into a particular type of upstream-downstream flowmeter and requires an acoustic path for the transducers.

An object of the invention was to devise a highly accurate upstream-downstream flowmeter tester or calibration circuit which simulates liquid flow in a pipe or conduit for any such flowmeter.

DISCLOSURE OF THE INVENTION

The above object has been achieved with an electrical apparatus which simulates the electrical return signal from pulses transmitted into a flowing liquid in upstream and downstream directions, mimicking the signal response of a pipe of known characteristics carrying a known flow of velocity of a specific fluid. The apparatus employs a circuit receiving as an input the electrical transmit signals which normally actuate a transducer converting electrical to acoustic energy. The electrical transmit signal is sent to a gated oscillator and a connected counter which produces an electrical signal having the duration of almost the mean transit time of an acoustic pulse between upstream and downstream transducers in the flowmeter. This transit time signal is incremented by preselected amounts related to units of the gated oscillator frequency, representing the exact mean transit time, as well as positive and negative changes in transit time at upstream and downstream transducers due to flow in a hypothetical pipe carrying fluid whose velocity is to be measured. The transit time simulation signals are fed to a second oscillator which produces a mimicking output signal. The mimicking signal is shaped to simulate upstream and downstream received signals at respective upstream and downstream acoustic transducers. The latter signals are directed back into the flowmeter where they are interpreted as having come from acoustic transducers, but such transducers have been bypassed.

With this circuit, a person testing or calibrating an upstream-downstream flowmeter need not employ a pipe full of fluid flowing at a known velocity. Rather, any upstream-downstream flowmeter can be readily calibrated or tested, usually more accurately than previously, with the circuit of the present invention.

BEST MODE FOR CARRYING OUT THE INVENTION

Figure 1:
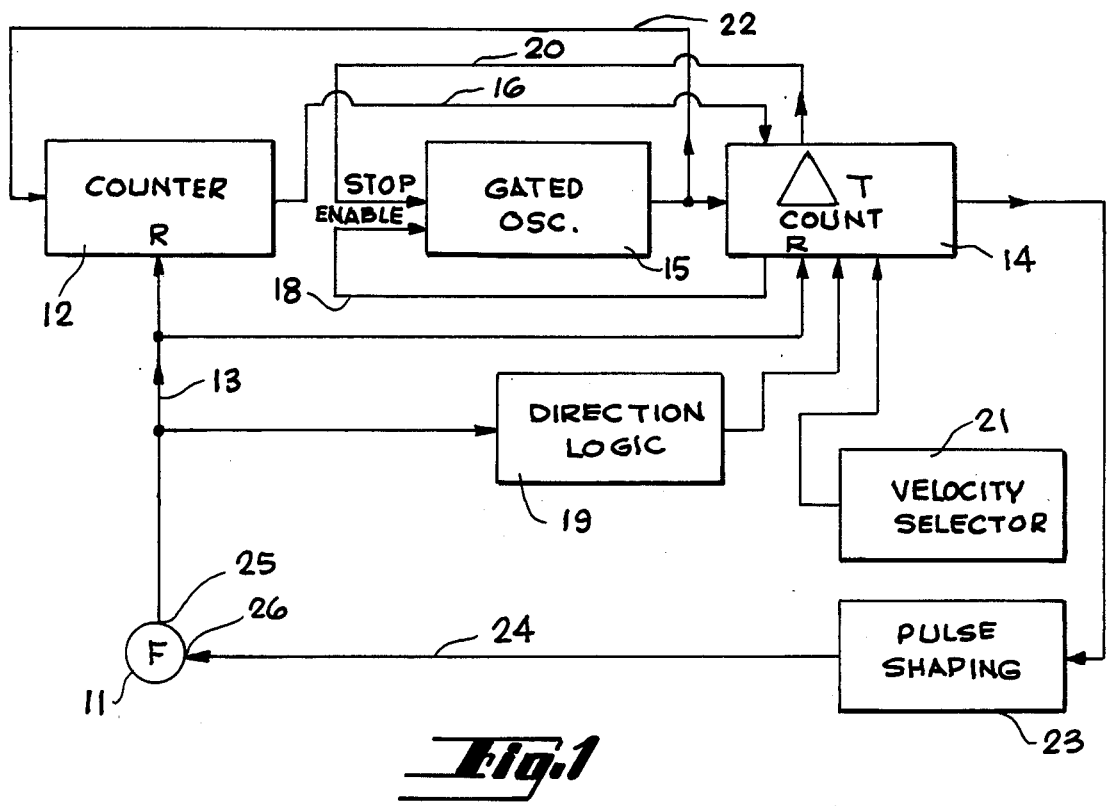
FIG. 1 is a simplified plan for the circuit of the present invention.

With reference to FIG. 1, a flowmeter 11 is shown to have terminals 25 and 26 which respectively transmit and receive signals. In practice, such terminals are associated with each of a pair of transducers which convert electrical to mechanical energy. The same transducer which acts as a transmitter may also act as a receiver for the pulses which are emitted and then received by upstream-downstream flowmeters. Alternatively, separate transmit and receive transducers may be used. Although not shown in the drawing, each flowmeter has both upstream and downstream transducers spaced apart at a distance with the upstream transducer directing a signal to the downstream transducer and vice versa. Each transducer picks up a signal from an opposite transducer, the signal having deviations in the time of arrival with reference to the opposing pulse. The deviations are indicators of flow velocity. The detailed configuration of a typical upstream-downstream flowmeter is described in U.S. Pat. No. 3,981,191, mentioned above, and incorporated by reference herein.

The terminals 25 and 26 bridge the electrical signal side of flowmeter transducers, or alternatively, communicate with the flowmeter in lieu of the transducers. Thus, the circuit of the present invention simulates a pipe or other conduit with liquid flowing therein, but completely obviating any acoustic pulses. However, the electrical transmit and receive signals which would normally be handled by the transducers, are employed.

Signal line 13 carries electrical transmit signals to the circuit of the present invention. A transmit signal is connected to a reset terminal of counter 12 and delta-t counter 14, clearing each counter. This causes delta-t counter 14 to transmit an enable pulse along line 16 to gated oscillator 15 which is running at a rate substantially in excess of the flowmeter pulse rate. The output from the gated oscillator is fed back to counter 12 along line 22 which establishes a pulse count almost equal to a predefined mean transit time. Once this pulse count has been reached, a signal is transmitted along line 16 to a counter, termed delta-t counter 14, which counts a limited number of pulses, say eight, of which pairs are selected to simulate upstream and downstream pulses at a transducer, relative to a mean transit time signal. Between downstream and upstream pulses is an artificial zero flow velocity pulse which is a number of pulses to be added to the previous pulse count, an almost mean transit time signal, to define the exact predefined mean transit time. Once the desired number of pulses is received, downstream, zero and upstream pulses are defined and a stop signal is transmitted along line 20 turning off the gated oscillator.

A switch or other variable element 21 selects specific pairs of upstream and downstream pulses which have been generated to simulate different velocities by means of observing the separations between pulses. Direction logic 19 determines whether a trigger pulse along line 13 is an upstream or a downstream pulse in order to avoid ambiguity with relative downstream or upstream characteristic of the two pulses being selected by the velocity selector 21.

The selected pulse pair is fed from delta-t counter 14 to a pulse shaping network 23 where the upstream and downstream pulses are shaped to simulate the return signals received at a flowmeter. An output signal from a pulse shaping network is fed along line 24 back to a terminal 26 of flowmeter 11. Each flowmeter transmit signal resets the counters and begins the cycle again. Thus, the circuit of FIG. 1 establishes upstream and downstream pulses relative to an exact mean transit time signal for simulating the response of a transducer connected to a pipe carrying a flowing fluid. Now, however, any flowmeter may be connected to the simulator of the present invention for testing and calibration purposes.

Figure 2:
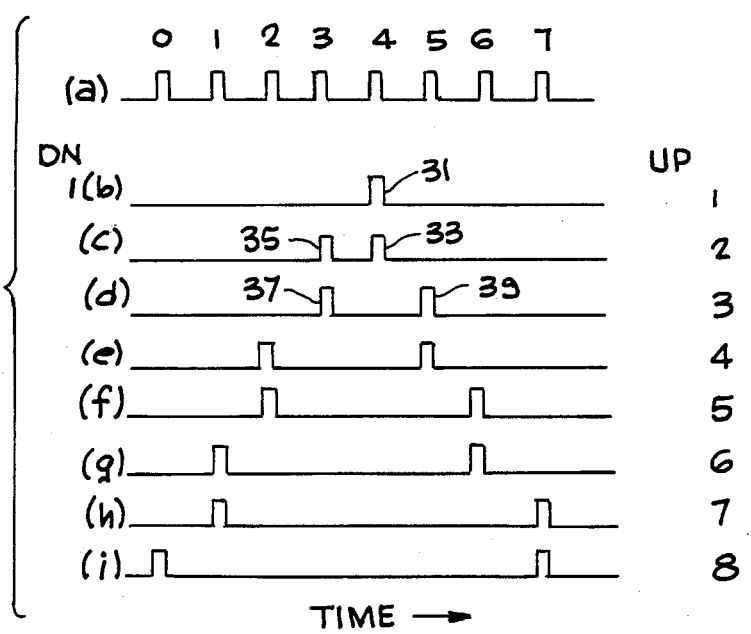
FIG. 2 is a timing diagram for flow simulation pulses generated by the circuit of FIG. 1.

In operation, once counter 12 counts a frequency equal to the almost mean transit time between upstream and downstream transducers, it is necessary to establish a difference in pulse counts at upstream and downstream transducers due to flow. This is done by counting a small number of additional pulses from gated oscillator 15 in another counter, delta-t counter 14. These are depicted in plot (a) of FIG. 2. There, eight individual pulses are seen forming an equally spaced pulse stream from oscillator 15. To depict flow, normally two pulses are needed, except for the situation where there is no flow. Thus, in FIG. 2(b), there is a single pulse 31 which may be regarded as the zero flow indicator and the exact mean transit time indicator, five pulse counts beyond the almost mean transit time signal. Pulses to the left of the pulse in plot 2(b) are downstream indicators, while those to the right are upstream indicators.

In plot 2(c), a pair of pulses 33 and 35 are shown corresponding to pulses 3 and 4 in plot (a). These two closely spaced pulses represent the lowest flow velocity which may be depicted, one pulse for the downstream indication and one pulse for the upstream indication. In FIG. 2(d), the pulses are separated by one pulse, pulses 37 and 39 corresponding to pulses 3 and 5 in plot (a). Again, the left pulse 37, corresponding to pulse 3 in plot (a) is for the downstream indication while pulse 39 is for the upstream indication. In each of the plots (e), (f) ... (i), the pulses are successively separated by one pulse length of plot (a), thereby indicating greater flow velocity. The velocity selector 21 is able to determine the extent of pulse spacing and hence which plot is applicable for flow velocity simulation. It is important to note that the position and time ratio is the same regardless of the clock rate which yields the almost mean transit time signal. Therefore, a given pulse pair will represent an average flow velocity regardless of pipe size. This provides a universal calibration unit which will have the same effect on all flowmeters, regardless of internal construction.

Figure 3A:
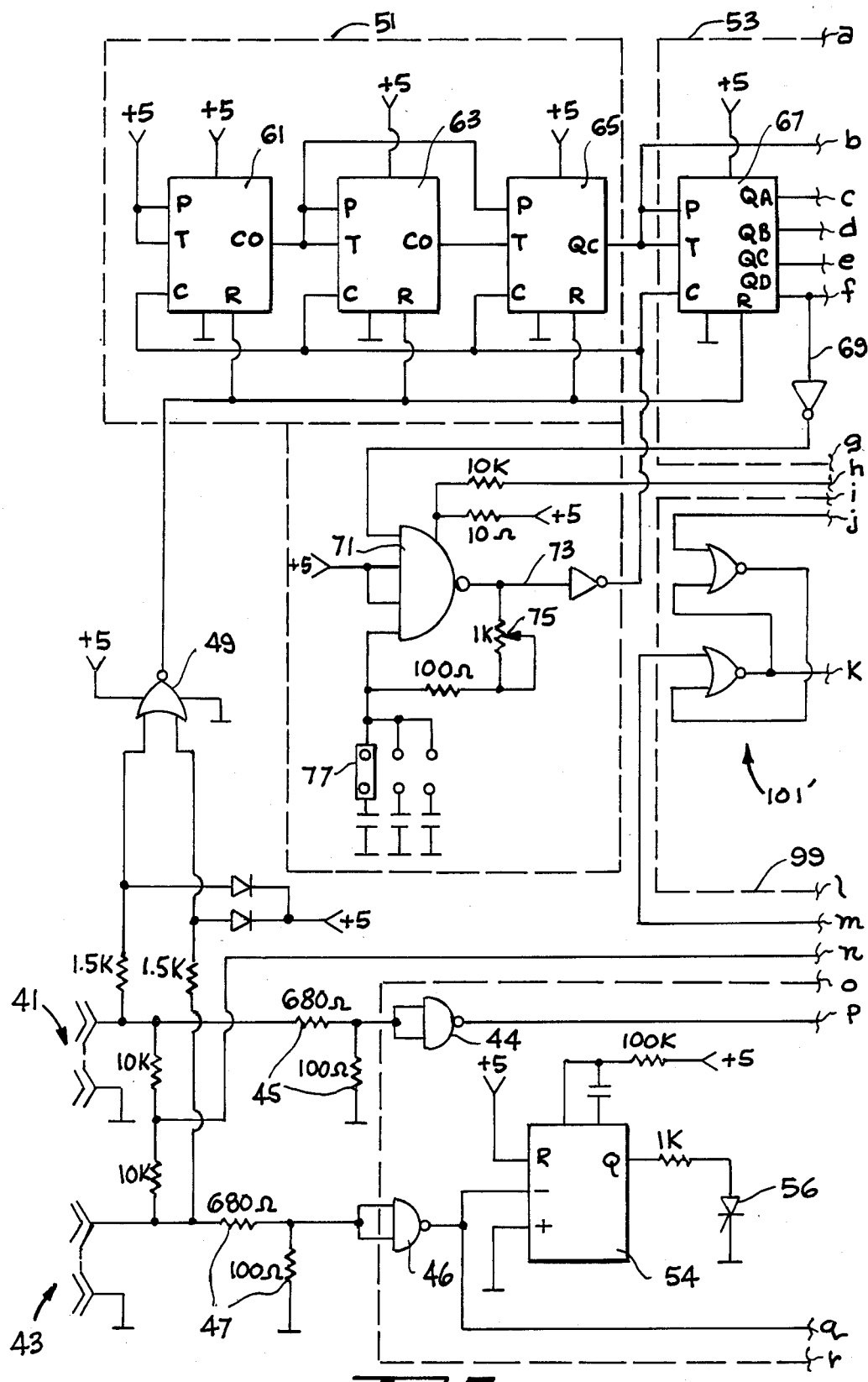
FIG. 3 is a detailed schematic for the circuit of FIG. 1.
Figure 3B:
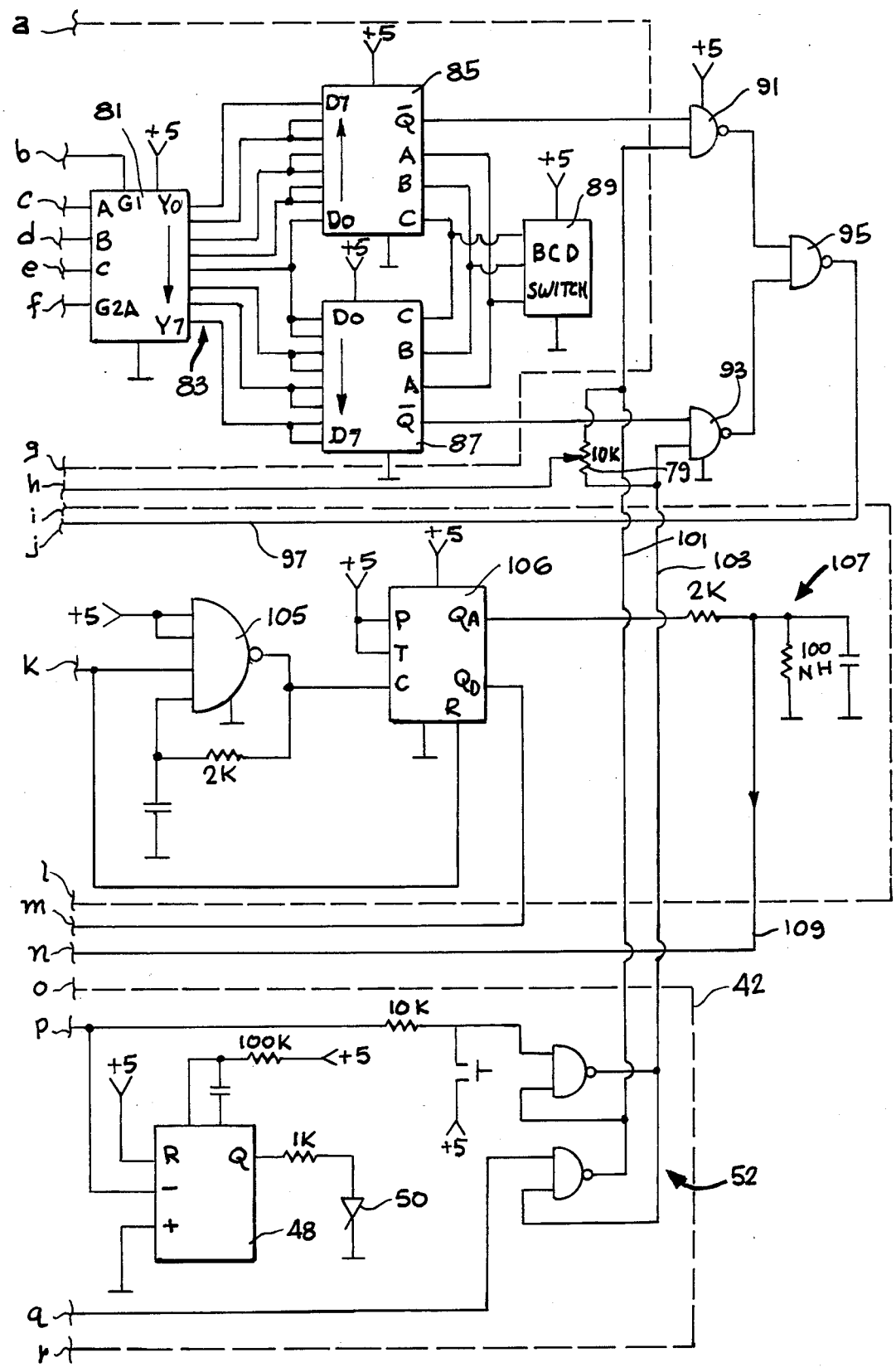

With reference to FIG. 3, a pair of jacks 41 are terminals which bridge an upstream transducer, while jacks 43 are terminals bridging a downstream transducer. Both transducers are bypassed so that only electrical signals are communicated to and from a flowmeter in lieu of the transducers. The transducers handle relatively high level signals and so resistors 45 and 47 serve as voltage dividers, lowering voltages to the semiconductor circuit components of the present invention. A first path from input terminals 41 and 43 is through the nor gate mixer 49 to first counter 51. Nor gate mixer has inputs from both upstream and downstream input terminals and combines the two to produce a trigger pulse as an output.

The trigger pulse is a reset signal for counter 51, as well as a counter within the delta-t count circuit 53. Counter 51 is a synchronous counter made up of individual counters 61, 63 and 65 connected in series. Such counters will typically count to a limit before putting out a carry pulse. The desired count is set, for example, so that an output of $2^{10}$ pulses is the desired total count, which will simulate the almost mean transit time for a selected oscillator frequency.

Once the desired count is achieved counter 67 of the delta-t circuit 53 is enabled which counts the next n pulses, say eight pulses, some of which will form downstream, zero and upstream pulses relative to the almost transit time signal. The pulse under the number 4 of plot (a) in FIG. 2, combined with the almost transit time signal, gives the exact selected mean transit time signal. If counter 67 is capable of counting to 16, eight pulses can be formed and, on the eighth pulse, an output pulse is transmitted along line 69, disabling Schmitt trigger oscillator 71 which was previously running.

The trigger pulse will reset counter 51, as well as counter 67 within the delta-t circuit. The resetting of the counters reverses the signal state on line 69, once again enabling oscillator 71. Oscillator 71 produces an output along line 73 which serves as a clock for all of the counters 61, 63, 65 and 67. Oscillator 71 runs at a frequency determined by the transit time to be simulated. The shortest transit time considered was 50 nanoseconds. This corresponds to a frequency of 20.6 MHz where there are 1029 pulses in the exact mean transit time (1024 in the almost mean transit time plus 5 incrementing pulses to reach zero). A ten foot pipe has a typical transit time of 2.93 microseconds corresponding to 3.5 MHz, a practical lower limit for the oscillator. A mid-range value for the oscillator is 12 MHz corresponding to a 5-inch path or a transit time of 86 microseconds. The oscillator has variable frequency adjustment network 75 as well as a range selection jumpers 77, allowing a wider dynamic range of frequencies to be generated by the oscillator. Oscillator 71 is also tuned in frequency by a variable resistor 79 which slightly modifies the phase of the oscillator output. This compensates for any phase shift between the oscillator and upstream and downstream pulses on lines 101 and 103 and serves as a zero set device.

The eight pulses counted by counter 67 are transmitted to a multiplexer 81, which distributes the pulses along eight lines 83 to one-of-eight decoders 85 and 87. These decoders allow a combination of two pulses, one designated upstream, another designated downstream, to be selected by BCD switch 89. The switch selects the combination of pulses desired to simulate flow, as illustrated in plots (b) through (i) of FIG. 2. After the desired simulated flow velocity is set in switch 89 and this is communicated to the decoders 85 and 87, the pulse outputs of the decoders are sent to nand gates 91 and 93 which also receive upstream and downstream pulse indicators along lines 101 and 103. The outputs from these gates are combined in another nand gate 95 for transmission along line 97 to the pulse shaping network 99.

Pulse shaping network 99 includes a nor gate latch 101' having inputs from the flow simulator 53 along line 97 and from the output of a counter 106 which is counting pulses from oscillator 105. When the output from counter 106 is low the nor gate latch is high, enabling second oscillator 105 which operates at a lower frequency than oscillator 71, approximately 2.2 MHz. The oscillator produces a number of transitions which are counted in counter 106, having the capability of counting to 16, forming eight pulses before the oscillator is stopped. These eight pulses are divided by 2 in the first stage of counter 105. The resulting four pulses are fed to a tank circuit 107 which is tuned to one half of the oscillator 105 frequency. The tank circuit produces a ringing, i.e. sinusoidal waves which are transmitted along line 109. Line 109 goes to both upstream and downstream transducers serviced respectively by jacks 41 and 43.

Decoder logic indicated within dashed line 42 consists of inverters 44 and 46 which establish proper logic levels for the input circuit. The signal from upstream terminal 41 passes through inverter 44 to the one shot multivibrator 48 which illuminates a lamp 50 and then goes to nand gate latch 52. Similarly, input signal from the downstream terminal 43 passes through inverter 46 and thence to the one shot multivibrator 54 which illuminates lamp 56. A signal from the inverter also passes to the nand gate latch 52 which feeds lines 101 and 103 with decoded upstream and downstream signal information for gate 95.

In summary, the present invention establishes, by counting pulses divided down from the frequency of an oscillator, a defined or preset almost mean transit time of an acoustic signal from an upstream-downstream flowmeter measuring fluid flow in a pipe. This signal is incremented by a pair of pulses, on the order of nanoseconds, to simulate in time the electrical signal received from a flowmeter transducer indicative of flow. The incremented signals are fed to an oscillator which establishes a shaped ringing signal in a tank circuit so that not only the timing of the return signal, but also the electrical appearance of the return signal, is mimicked. The output signals from the tank circuit are fed back to flowmeter terminals bridging or substituting for a transducer output.

I claim:

1. A circuit simulating the electrical signal response of a flowing fluid whose velocity is to be measured by an upstream-downstream flowmeter with fixed transducers comprising, input means for acquiring electrical transmit signals from a flowmeter of the type having upstream and downstream transducers which convert electrical transmit signals to acoustic signals, a gated first oscillator connected to receive and be gated by the electrical transmit signal and having first counter means connected to said oscillator for receiving the gated oscillator output signal and dividing down said signal to the extent said divided signal electrically simulates in time a signal having almost the mean transit time of an acoustic pulse between upstream and downstream transducers in said flowmeter, pulse means for incrementing the almost mean transit time signal by preselected amounts of time representing upstream and downstream pulses with respect to an exact mean transit time signal simulating, in time, signals received at said upstream and downstream transducers due to flow in a hypothetical pipe carrying a known fluid whose velocity is to be measured, a second oscillator connected for triggering by said upstream and downstream pulse simulation signals and having second counter means connected to said oscillator for receiving the oscillator output signal and producing in response thereto mimicking output signals shaped to simulate upstream and downstream received signals at respective upstream and downstream acoustic transducers, and injector means for directing said mimicking output signals to said upstream and downstream transducers.

2. The circuit of claim 1 wherein said pulse means has a variable element means connected thereto for selecting the amount of incrementing or decrementing of the nearly mean transit time signal.

3. The circuit of claim 1 wherein said pulse means for incrementing and decrementing the mean transit time signal by preselected amounts comprises a third counter means connected to a multiplexer, the multiplexer connected to a switch, said third counter means for making diverse pulse spacings available at the multiplexer, said switch connected to select among various pulse spacings thereby forming said transit time simulation signals.

4. The circuit of claim 3 wherein said first counter means is connected sequentially ahead of the third counter means whereby the nearly mean transit time signal is always formed prior to upstream and downstream simulation signals.

5. The circuit of claim 1 wherein said input means comprises logic means connected to receive said transmit signals for establishing the identity of upstream and downstream signals corresponding to upstream and downstream acoustic transducers, said upstream and downstream signals fed to said pulse means for logical combination with said upstream and downstream simulation signals.

6. The circuit of claim 1 wherein said second oscillator has an output with a tank circuit connected thereto, said tank circuit producing a ringing in oscillator output pulses.

* * * * *